Patented Jan. 27, 1953

2,626,969

UNITED STATES PATENT OFFICE 2,626,969

PURIFYING AND CONCENTRATING HEVEA RUBBER LATEX

Eakin M. Glymph, Akron, Ohio, assignor to The Firestone Tire & Rubber Company, Akron, Ohio, a corporation of Ohio No Drawing. Application January 28, 1950, Serial No. 141,157

15 Claims. (Cl. 260—822)

This invention relates to treatment of ammonia preserved Hevea rubber latices and more particularly to treatment of such preserved latices which are to be shipped and/or stored in concentrated form prior to fabrication into articles of manufacture.

One reason for latex concentration stems from the great distances which normally separate rubber plantations and manufacturing centers. Lessening the bulk of material to be shipped, by concentrating to remove excess water, effects obvious economy. In addition, high solids latices such as those obtained by concentration are particularly adapted to certain manufacturing processes, e. g., dipping, coating, and the preparation of sponge rubber.

Methods of concentrating latex may be classified into two categories: (1) methods wherein purification is collaterally effected by a distinct separation into a rubber-rich layer and an essentially rubber-poor layer, the latter of which contains most of the non-rubber ingredients and may be separated from the former, e. g., centrifuging, creaming, electrode cantation, and the like, and (2) methods wherein no appreciable purification is effected, e. g., evaporation. For reasons which will become apparent, it is in conjunction with methods of concentrating of the first category that the present invention is concerned. For the purpose of simplification, therefore, the meaning of "concentration" as used hereinafter will be limited to include only said first category.

Many concentrated ammonia preserved latices, particularly those which have been shipped and/or stored for extended periods of time, contain a non-rubber sludge of undetermined origin—apparently formed after concentration—which renders the latices unsatisfactory for normal manufacturing purposes without expensive reprocessing, as for example, centrifugal clarification or filtering.

One means of obviating the difficulty (at the plantation) is to hold concentrated ammonia preserved latices in tanks or vats for extended periods of time (30 to 40 days) and then centrifugally clarify or filter them. Such procedures have the obvious disadvantage of being cumbersome and inefficient in that they not only are time consuming but are also wasteful of man-hours and equipment.

The primary object, therefore, of the present invention is to provide a method for producing concentrated ammonia preserved Hevea rubber latices which may be shipped and stored with substantially no subsequent sludge formation.

Another object is to provide a treatment for ammonia preserved natural rubber latices particularly adapted for practicing at a rubber plantation.

A further object is to provide an efficient and economical method of producing substantially sludge-free concentrated latices.

A still further object is to provide a method of producing concentrated ammonia preserved natural rubber latices having improved processing qualities.

Quite surprisingly, the above and further objects are conveniently achieved in accordance with the invention by increasing the phosphate concentration of natural rubber latex by adding a soluble phosphate to said latex and then concentrating the latex to a total solids typical for commercial concentrates (about 60% and higher). The natural rubber latices treated in accordance with the invention are so-called ammonia preserved latices, that is, latices stabilized against coagulation by adjusting to a pH value of not less than 8.5 and preferably not more than 11.0 by means of ammonia addition. Preferably, the soluble phosphate is added after the latex has been stabilized; however, the phosphate may be added before the latex is ammoniated. The phosphates may be primary, secondary or tertiary. Ammonium phosphates such as $(NH_4)H_2PO_4$, $(NH_4)_2HPO_4$, and $(NH_4)_3PO_4$ have been found to be particularly suitable; however, other soluble phosphates such as sodium and potassium phosphates are also operative and are also within the contemplation of the present invention.

The effectiveness of adding a soluble phosphate to latex, in accordance with the invention, has been found to vary directly with the amount of phosphate added. In order to more specifically define the invention, the soluble phosphate additions set out in th following examples and in the appended claims are given as percent phosphate expressed as

based on the weight of latex.

EXAMPLE 1

A sample of ammoniated (0.3% $NH_3$ on the latex) Hevea rubber latex was divided into two test portions. To one portion 0.072% diammonium phosphate, expressed as

based on the weight of latex, was added. No phosphate was added to the other portion and it was retained as a control. After the two test portions had stood for about thirty minutes, they were centrifuged. The pH of each concentrate was adjusted to approximately 10.5 (as shown in Table I) by adding ammonia, and then each concentrate was bottled, capped and stored. The sludge which formed in the concentrates was collected on felt filters on the seventh, fourteenth and thirtieth days and reported as percent sludge on the weight of latex of the original test portions. The following results were obtained:

*Table I*

|  | Feed Latex | | Concentrated Latex | | | | |
|---|---|---|---|---|---|---|---|
|  | Total solids | pH | Total solids | pH | Percent Sludge after— | | |
|  |  |  |  |  | 7 days | 14 days | 30 days |
| No phosphate added. | 35.2 | 9.87 | 64.6 | 10.49 | .061 | .418 | .229 |
| Phosphate added.. | 35.1 | 9.74 | 64.3 | 10.45 | .044 | .040 | .036 |

A substantially sludge-free concentrated latex suitable for normal latex processes was produced by the phosphate treatment, whereas the untreated latex contained a substantial amount of sludge and was unsatisfactory without subsequent reprocessing.

EXAMPLE 2

Ammonia preserved (containing 0.3% $NH_3$ on the latex, pH 9.95) field latex, having a total solids content of 43.5 was divided into several samples. To these samples diammonium phosphate was added in amounts varying from 0.000 to 0.720% expressed as $$PO_4^=$$

on the latex (0.00 to 1.00% $(NH_4)_2HPO_4$ on the latex). The samples were allowed to stand overnight and were then centrifuged. The ammonia ($NH_3$) concentrations of the centrifuged samples were adjusted to 0.70%, resulting in a pH of 10.4, and the samples were stored. The weight and volume of sludge were determined both on the 21st and the 30th days. Mechanical stabilities were also determined on both of the above days. Determinations of KOH numbers were, however, made on the 30th day only.

The weight determinations for sludge were made according to the following procedure. A test portion of a sample was diluted 1:1 with 0.5% ammonia water. Forty grams of the diluted latex was weighed into a 50 ml. conical centrifuge tube and centrifuged in a Type C international Centrifuge[1] at maximum speed using a head arrangement giving a relative centrifugal force of 1400 for 30 minutes or until a clear liquid

[1] Supplier: International Equipment Co., 352 Western Ave., Boston, Mass.

zone appeared above the sludge, which was packed in the bottom of the tube. The thick latex paste was then removed from the top of the tube; the liquid latex was siphoned off; and the tube was then filled with an alcohol-ammonia water wash solution and recentrifuged. Washing and recentrifuging were repeated until the supernatant liquid above the packed sludge was clear. After washing, the wet sludge was transferred quantitatively to a weighed flask and dried overnight at 70° C. The amount of sludge is reported in Table II as weight percent based on the original undiluted latex.

The volume determinations for sludge were made in a somewhat similar manner. A test portion of a sample was diluted 1:1 with 0.5% ammonia water and placed in a centrifuge tube having a graduated capillary tube welded on the bottom. The test portion was then centrifuged in a Type C international Centrifuge for 30 minutes at 2000 R. P. M. Sludge packed in the graduated capillary tube, and its volume was read off directly. The volume of sludge is reported in Table II as volume percent on the original undiluted latex.

*Table II*

| Sample | A | B | C | D | E | F | G | H |
|---|---|---|---|---|---|---|---|---|
| Percent $PO_4^=$ on latex | 0.000 | 0.036 | 0.072 | 0.144 | 0.216 | 0.288 | 0.360 | 0.720 |
| Total Solids | 65.7 | 64.4 | 64.7 | 64.4 | 64.1 | 63.3 | 62.2 | 61.8 |
| Stored for 21 Days: |  |  |  |  |  |  |  |  |
| Vol. Percent Sludge | 1.000 | 0.620 | 0.048 | 0.061 | 0.039 | 0.037 | 0.048 | 0.024 |
| Wt. Percent Sludge | 0.155 | 0.085 | 0.023 | 0.023 | 0.010 | 0.0116 | 0.026 | 0.020 |
| Mech. Stability | 605 | 805 | 760 | 820 | 690 | 650 | 640 | 455 |
| Stored for 30 Days: |  |  |  |  |  |  |  |  |
| Vol. Percent Sludge | 1.090 | 0.630 | 0.061 | 0.050 | ------ | 0.073 | 0.048 | 0.049 |
| Wt. Percent Sludge | 0.133 | 0.091 | 0.027 | 0.030 | 0.034 | 0.026 | 0.018 | 0.025 |
| Mech. Stability | 850 | 945 | 1.075 | 925 | 855 | 610 | 695 | 285 |
| KOH Number | 0.56 | 0.56 | 0.60 | 0.67 | 0.73 | 0.79 | 0.88 | 1.39 |

The sludge formed in the untreated sample was considerable and was sufficient to render the sample undesirable as such for the manufacturing processes in which latex is normally utilized. On the other hand, improvement was quite marked with the addition of even relatively small amounts of phosphate in accordance with the invention. The addition of only 0.036% phosphate expressed as $$PO_4^=$$

based on the weight of latex, reduced sludge formation by about one-half. Seventy-two thousandths percent reduced the amount of sludge formed to a negligible figure. Greater concentrations of phosphate also reduced the sludge formation but not to a substantially smaller amount.

An additional surprising result of practicing the invention is the increased mechanical stability obtained by adding phosphates up to about 0.25% expressed as $$PO_4^{\equiv}$$

It should be noted that within this range the KOH number is not essentially affected. The practice of the invention, therefore, not only produces essentially sludge-free latices but also produces latices with improved processing properties.

EXAMPLE 3

Two samples of fresh latex were taken from each of several different areas of a large Hevea plantation and ammoniated to 0.30% ammonia. Two hundred and forty-eight thousandths percent (0.248%) of dihydrogen ammonium phosphate expressed as $$PO_4^{\equiv}$$

(0.3% $(NH_4)H_2PO_4$ on the latex) was added to one of each pair of samples; the other sample was not treated with phosphate and served as a control. All of the samples were then allowed to stand overnight. They were then centrifuged, ammoniated to 0.70% ammonia, and stored for thirty days in glass bottles. The volumes of sludge formed were then determined according to the procedure set out in Example 2 and are reported below in Table III as volume percent on original undiluted latex. (It should be noted that, as shown in Table II, volume percent and weight percent show essentially the same behavior. Though the volume percent is not as accurate quantitatively, it is, nevertheless, sufficiently indicative to demonstrate the effectiveness of the invention in reducing the formation of sludge in concentrated latices to a negligible amount.)

Table III

| Area No. | Volume Percent of Sludge | |
|---|---|---|
| | No phosphate | Phosphate added |
| 1 | .784 | .037 |
| 2 | .735 | .050 |
| 3 | .145 | .024 |
| 4 | .079 | .025 |
| 5 | .218 | .073 |
| 6 | .092 | .025 |
| 7 | .919 | .049 |
| 8 | 1.110 | .024 |
| 9 | .802 | .025 |
| 10 | 1.052 | .025 |
| 11 | .968 | .085 |
| 12 | .579 | .099 |
| 13 | .036 | .024 |

Sludge formation in different concentrated latices varies considerably, as is indicated by Table III. The geographic origin of the latex is apparently an important factor. Nevertheless, soluble phosphates retard sludge formation after concentration regardless of the sludge forming propensity of the initial latex. As is shown in Table III, all of the latices treated were substantially improved.

It should be understood that the foregoing description contains a limited number of embodiments of the invention, and that numerous variations are possible without departing from the scope thereof.

What is claimed is:

1. In concentrating Hevea rubber latex the steps of adjusting the pH of fresh Hevea rubber latex to a value not less than 8.5 by the addition of ammonia thereto, adding to the ammoniated latex at least 0.035% and not more than 0.25% expressed as $$PO_4^{\equiv}$$

based on the weight of latex of a soluble ammonium phosphate, the phosphate addition being insufficient to cause separation and thickening of the latex, and then centrifuging the thus treated latex to produce a concentrated latex of about 60% and higher total solids which can be shipped and stored with substantially no subsequent sludge formation, said concentrated latex having improved mechanical stability.

2. A method of producing concentrated Hevea rubber latex which comprises treating ammonia preserved Hevea rubber field latex with at least 0.035% and not more than 0.25% expressed as $$PO_4^{\equiv}$$

based on the weight of latex of a water soluble phosphate selected from the group consisting of sodium, potassium and ammonium phosphate, the phosphate addition being insufficient to cause separation and thickening of the latex, and subsequently concentrating the latex by separating it into a rubber-rich layer and an essentially rubber-poor layer, the rubber-rich layer being a concentrated latex of about 60% and higher total solids which can be shipped and stored with substantially no subsequent sludge formation, said concentrated latex having improved mechanical stability.

3. A method of producing a concentrated Hevea rubber latex which comprises adding to ammonia preserved Hevea rubber field latex at least 0.035% and not more than 0.25% expressed as $$PO_4^{\equiv}$$

based on the weight of the latex of a water soluble phosphate selected from the group consisting of sodium, potassium and ammonium phosphates, the phosphate addition being insufficient to cause separation and thickening of the latex, and subsequently centrifuging the latex to produce a concentrated latex of about 60% and higher total solids which can be shipped and stored with substantially no subsequent sludge formation, said concentrated latex having improved mechanical stability.

4. A method of producing a concentrated Hevea rubber latex which comprises the steps of adding to an ammonia preserved Hevea rubber field latex at least 0.035% and not more than 0.25% expressed as $$PO_4^{\equiv}$$

based on the weight of the latex of a water soluble phosphate selected from the group consisting of sodium, potassium and ammonium phosphates, the phosphate addition being insufficient to cause separation and thickening of the latex, and then concentrating the thus treated latex by subjecting the same to centrifugal force to produce a concentrated latex of about 60% and higher total solids which can be shipped and stored with substantially no subsequent sludge formation, said concentrated latex having improved mechanical stability.

5. A method of producing a concentrated Hevea rubber latex which comprises adding ammonia to a fresh Heavea rubber latex in an amount sufficient to produce an ammoniated latex having a pH value of at least 8.5 and not in excess of 11.0, adding to the ammoniating latex at least 0.035% and not more than 0.25% expressed as $$PO_4^{\equiv}$$

based on the weight of the latex of a water soluble phosphate selected from the group consisting of sodium, potassium and ammonium phosphates, the phosphate addition being insufficient to cause separation and thickening of the latex, and then concentrating the latex by subjecting the same to centrifugal force to produce a concentrated latex of about 60% and higher total solids which can be shipped and stored with substantially no subsequent sludge formation, said concentrated latex having improved mechanical stability.

6. A method of producing concentrated Hevea rubber latex which comprises adding ammonia and at least 0.035% and not more than 0.25% expressed as $$PO_4^{\equiv}$$

based on the weight of latex of a water soluble phosphate selected from the group consisting of sodium, potassium and ammonium phosphates to Hevea rubber latex, the phosphate addition being insufficient to cause separation and thickening of the latex, and subsequently centrifuging the latex to produce a concentrated latex of about 60% and higher total solids which can be shipped and stored with substantially no subsequent sludge formation, said concentrated latex having improved mechanical stability.

7. A method of producing concentrated Hevea rubber latex which comprises adding ammonia and at least 0.035% and not more than 0.25% expressed as $$PO_4^{\equiv}$$

based on the weight of latex of a water soluble phosphate selected from the group consisting of sodium, potassium and ammonium phosphates to Hevea rubber latex, the phosphate addition being insufficient to cause separation and thickening of the latex, and subsequently concentrating the latex by separating it into a rubber-rich layer and an essentially rubber-poor layer, the rubber-rich layer being a concentrated latex of about 60% and higher total solids which can be shipped and stored with substantially no subsequent sludge formation, said concentrated latex having improved mechanical stability.

8. A method of producing concentrated Hevea rubber latex which comprises adding at least 0.035% and not more than 0.25% expressed as $$PO_4^{\equiv}$$

based on the weight of the latex of a water soluble phosphate selected from the group consisting of sodium, potassium and ammonium phosphates to fresh Hevea rubber latex, the phosphate addition being insufficient to cause separation and thickening of the latex, ammoniating the latex and subsequently concentrating the thus treated latex by separating it into a rubber-rich layer and an essentially rubber-poor layer, the rubber-rich layer being a concentrated latex of about 60% and higher total solids which can be shipped and stored with substantially no subsequent sludge formation, said concentrated latex having improved mechanical stability.

9. A concentrated Hevea rubber latex produced by the method of claim 6.

10. A method of producing concentrated Hevea rubber latex which comprises adding ammonia and at least 0.035% and not more than 0.25% expressed as $$PO_4^{\equiv}$$

based on the weight of latex of a water soluble sodium phosphate to Hevea rubber latex, the phosphate addition being insufficient to cause separation and thickening of the latex, and subsequently centrifuging the latex to produce a concentrated latex of about 60% and higher total solids which can be shipped and stored with substantially no subsequent sludge formation, said concentrated latex having improved mechanical stability.

11. A method of producing concentrated Hevea rubber latex which comprises adding ammonia and at least 0.035% and not more than 0.25% expressed as $$PO_4^{\equiv}$$

based on the weight of latex of a water soluble potassium phosphate to Hevea rubber latex, the phosphate addition being insufficient to cause separation and thickening of the latex, and subsequently centrifuging the latex to produce a concentrated latex of about 60% and higher total solids which can be shipped and stored with substantially no subsequent sludge formation, said concentrated latex having improved mechanical stability.

12. A method of producing concentrated Hevea rubber latex which comprises adding ammonia and at least 0.035% and not more than 0.25% expressed as $$PO_4^{\equiv}$$

based on the weight of latex of a water soluble ammonium phosphate to Hevea rubber latex, the phosphate addition being insufficient to cause separation and thickening of the latex, and subsequently centrifuging the latex to produce a concentrated latex of about 60% and higher total solids which can be shipped and stored with substantially no subsequent sludge formation, said concentrated latex having improved mechanical stability.

13. A concentrated Hevea rubber latex produced by the method of claim 10.

14. A concentrated Hevea rubber latex produced by the method of claim 11.

15. A concentrated Hevea rubber latex produced by the method of claim 12.

EAKIN M. GLYMPH.

REFERENCES CITED

The following references are of record in the file of this patent:

UNITED STATES PATENTS

| Number | Name | Date |
|---|---|---|
| 1,562,262 | Smith | Nov. 17, 1925 |
| 1,678,022 | Smith | July 24, 1928 |
| 1,834,148 | Gibbons | Dec. 1, 1931 |
| 2,495,141 | Schmidt | Jan. 17, 1950 |

FOREIGN PATENTS

| Number | Country | Date |
|---|---|---|
| 542,091 | Great Britain | Dec. 24, 1941 |
| 594,635 | Great Britain | Nov. 17, 1947 |